United States Patent [19]

Howlett

[11] 4,406,532
[45] Sep. 27, 1983

[54] WIDE ANGLE COLOR PHOTOGRAPHY METHOD AND SYSTEM

[76] Inventor: Eric M. Howlett, 16 Berwick Rd., Newton Centre, Mass. 02159

[21] Appl. No.: 133,796

[22] Filed: Mar. 25, 1980

[51] Int. Cl.³ .................. G03B 35/08; G02B 17/06
[52] U.S. Cl. .................................. 354/114; 350/133
[58] Field of Search .................. 354/112, 114, 115; 350/130–133, 239

[56] References Cited

U.S. PATENT DOCUMENTS

| | | | |
|---|---|---|---|
| 2,093,520 | 9/1937 | Hayashi | 350/133 |
| 2,573,543 | 10/1951 | Childs | 354/114 X |
| 3,424,511 | 1/1969 | Ratliff | 350/239 X |
| 3,537,771 | 11/1970 | Trufanoff | 350/133 UX |
| 3,601,475 | 8/1971 | Ratliff | 350/239 |
| 3,957,358 | 5/1976 | Holliday | 350/239 |

Primary Examiner—Donald A. Griffin
Attorney, Agent, or Firm—Bruce D. Sunstein

[57] ABSTRACT

A method of color imaging involves the steps of (a) forming an image while introducing a predetermined chromatic difference in lateral magnification, (b) storing the image on a medium such as color film, and (c) forming from the stored image, another image, while introducing a chromatic difference in lateral magnification that is opposite to the predetermined difference in lateral magnification introduced in step (a). The system of the invention has, in a basic embodiment, a first lens system for forming an image while introducing a predetermined chromatic difference in lateral magnification, a medium such as color film to store the image, and a second lens system to form, from the stored image, a second image while introducing a chromatic difference in lateral magnification that is opposite to the predetermined chromatic difference in lateral magnification introduced by the first lens system. The invention also relates to the stored images formed as described above.

22 Claims, 12 Drawing Figures

A. CAMERA WITH SIMPLE LENS

WHITE SQUARE

COLOR TRANSPARENCY WITH "BARREL" DISTORTION AND LATERAL CHROMATISM

B.

C. VIEWER USING CAMERA LENS—EYE SEES ORIGINAL WHITE SQUARE

WIDE ANGLE COLOR PHOTOGRAPHY METHOD AND SYSTEM

FIELD OF INVENTION

This invention pertains to photography and optics, and, in particular, to stereoscopic photography.

BACKGROUND ART

In 1924 Colonel L. E. W. van Albada demonstrated a wide angle stereoscope to the Optical Society of London. (Proc. Optical Soc. London 1924-25.) The special merit of his stereoscope lay in the fact that the magnifiers provided an 85 or 90 degree field of view—twice the usual field angle and four times the scenic area. He succeeded in achieving this wide angle by neutralizing the distortion of his magnifiers with a compensating distortion deliberately introduced into the images being viewed, which were, of course, black-and-white. The magnifiers of his system were expensive: even though they did not have to be corrected for distortion, they did have to be corrected for lateral chromatism—the "color fringing" commonly seen in large magnifiers at the edge of their fields of view. To this day the cost of large lenses corrected for lateral chromatism has doomed stereoscopy to fields of view ranging from 20 degrees (e.g. "Viewmaster") to about 50 degrees (e.g. "Stereo Realist"). Only small or distant objects can be rendered full size in such narrow fields, so that most subjects are miniaturized and distorted. There is little or no possibility of looking around in the scene, so landscapes, buildings and interiors lose their impact. Even portraits must be made from a distant perspective and cannot be close and personal. In addition, because the frame of the scene is clearly before the eyes, rather than being substantially beyond the edge of the field, we have the unnatural strain complained of in ordinary 3-D systems and called the "window" effect in which the eyes seem to be looking through two holes, or the content of the scene seems to be obtruding itself through a distant window, depending on where the designer decides to locate the frame stereoptically. This effect is quite foreign to ordinary experience and largely destroys the "presence" that stereo imagery ought to have. Stereoscopy has, in consequence of these factors, never become more than a novelty.

DISCLOSURE OF THE INVENTION

Accordingly it is an object of this invention to provide a very wide angle stereoscopic system of photography utilizing low cost, non-achromatic magnifier lenses.

It is a further object of this invention to provide a very wide angle stereoscopic camera of "box camera" simplicity.

It is a further object of this invention to provide a stereoscopic photographic system that matches the human eye in depth of focus and acuity, that provides actual size, true perspective (orthoscopic), very wide field (100 degrees and more) images with a film format small enough to permit co-planar grouping of two images for stereoscopy.

It is a further object of this invention to provide a film image having characteristics such that, when the images are viewed through large, very wide angle magnifiers that have not been corrected for lateral chromatism, the lack of correction of the magnifier is not apparent. By novel use of modern high speed color film, fields of 100 degrees and more can thus be achieved economically, so both the cost and performance barriers to popular stereoscopy are removed.

These and other objects of the invention are achieved by providing a method of color imaging involving the steps of (a) forming an image while introducing a predetermined chromatic difference in lateral magnification, (b) storing the image on a medium such as color film, and (c) forming from the stored image, another image, while introducing a chromatic difference in lateral magnification that is opposite to the predetermined difference in lateral magnification introduced in step (a). The system of the invention has, in a basic embodiment, a first lens system for forming an image while introducing a predetermined chromatic difference in lateral magnification, a medium such as color film to store the image, and a second lens system to form, from the stored image, a second image while introducing a chromatic difference in lateral magnification that is opposite to the predetermined chromatic difference in lateral magnification introduced by the first lens system. The invention also relates to the stored images formed as described above. When I state here and in the claims, that the chromatic difference in lateral magnification ("lateral chromatism") is "opposite", I do not mean to suggest that the lateral chromatism introduced by the method step (a) or the first lens system is exactly cancelled or compensated. I mean only that the lateral chromatism introduced by the method in step (c) or the second lens system is opposite in "sense" to that of the lateral chromatism originally introduced by step (a) or the first lens system. Complete compensation of lateral chromatism, although usually desirable, in many circumstances is not necessary, practical, or even possible.

In a preferred embodiment, the system of the present invention comprises a camera, a transparency and a magnifying viewer, all preferably stereoptical. The camera lenses exhibit a large and operative amount of positive distortion and lateral chromatism, both of which are normally considered lens defects to those skilled in the art. These defects are duly recorded on the color film, which may be either negative or reversal film. After processing, the image on the resulting transparency (which I call in its preferred form a "neutralizing stereogram") looks like a typical "fisheye" image, except that the distortion is even more pronounced and there is a degree of color fringing that would ordinarily be considered extremely objectionable. When seen through the uncorrected magnifying viewer lenses, however, the image is corrected in the sense that the straightness of straight lines is restored, and also in the sense that objects appear to be the same size as they did at the original vantage point of the camera. Not only is the distortion corrected, but the lateral chromatism of the magnifier is significantly compensated and substantially neutralized by the fringes of the neutralizing image. What is new is not the making of distorted photographic images to compensate the distortion in a magnifier: that, as I mentioned in BACKGROUND ART goes back at least to 1924. What is new—and possible only with color film—is the process of making a chromatically defective image to compensate and neutralize the lateral chromatism in a magnifier. The use of distortion is very important, however, not only to compensate the magnifier distortion, but to permit efficient compression of a very wide field into a small stereogram format.

Not only does the use of the neutralizing stereogram make inexpensive very-wide-angle stereo magnifiers possible, but the system camera that produces the neutralizing stereogram is made less expensive than the ordinary stereo camera by the fact that its lenses do not have to be corrected for distortion or lateral chromatism.

The "camera" of the foregoing discussion may be any device that makes a neutralizing transparency or stereogram from an actual scene or from another image that is not neutralizing. The "viewer" of the foregoing discussion may be any device for viewing directly, or for projecting or making prints from a neutralizing transparency. The neutralizing transparency, with its prescribed and operative amount of negative distortion and lateral chromatism, is the element common to all systems and embodiments of the present invention.

The film used in systems of the present invention may be conventional reversal or positive and negative color films in a prescribed format.

DETAILED DESCRIPTION OF SPECIFIC EMBODIMENTS

A Monocular Very-Wide-Angle System

Figure 1:
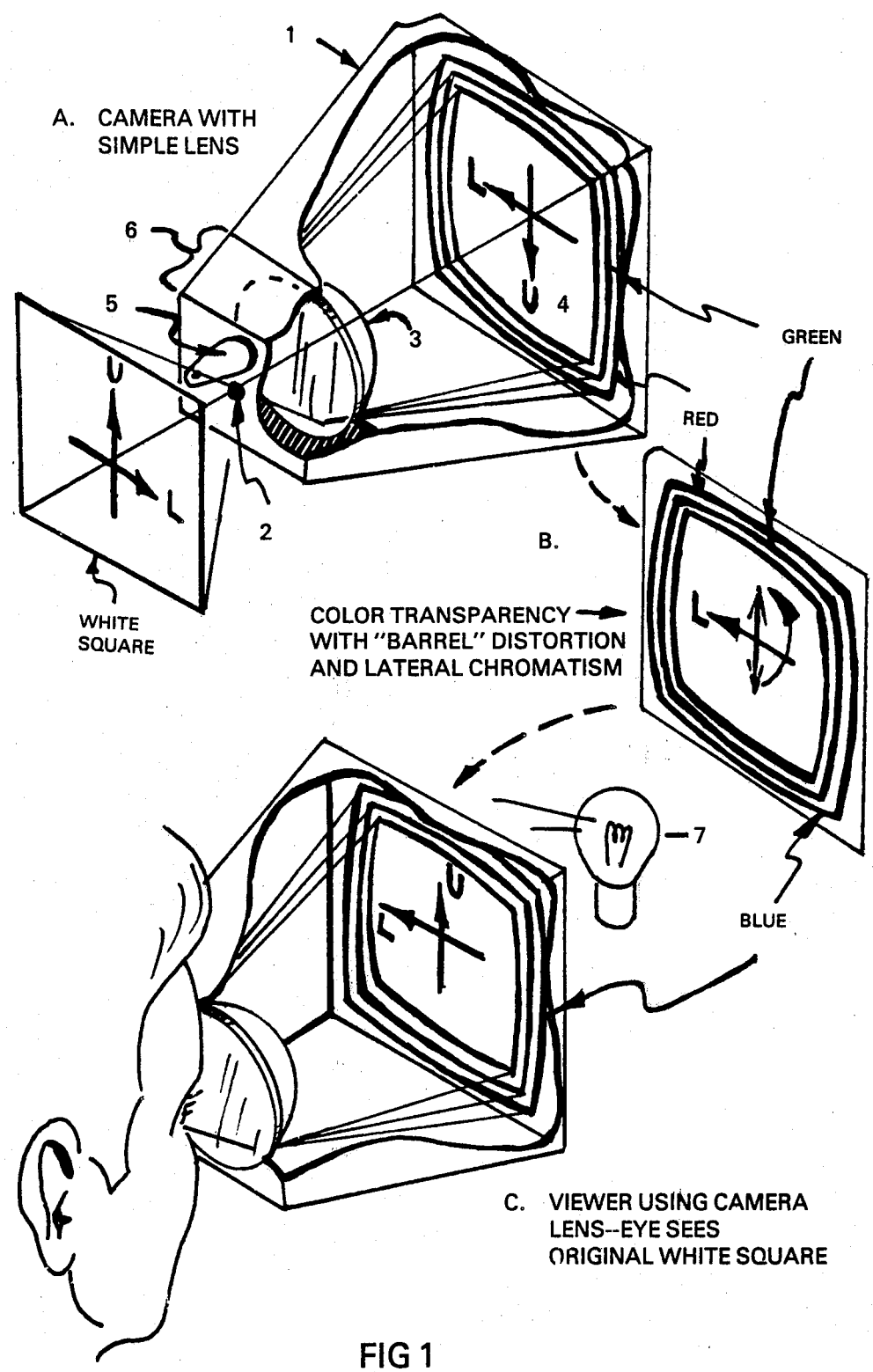
FIG. 1 shows the three essential components of the system of the invention: 1A being the camera for making the neutralizing transparency, 1B being the transparency itself, and 1C being the viewer, which can in principle be optically identical to the camera with the camera aperture stop removed.

The entire system and method of the invention in a monocular embodiment are shown somewhat diagrammatically in FIG. 1. FIG. 1A shows the camera element, comprising essentially a housing 1 (shown cut away for illustration), a small aperture 2, on the object side of a spherical plano-convex lens 3, which is focussed on the film 4 supported at the film plane, at the back of the camera. A shutter for determining exposure is at 5. This camera differs from an ordinary box camera only in that the lens is much larger (40 to 50 mm in diameter, so that it can also serve as the viewer lens) and in that no attempt is made to correct it for distortion or lateral chromatism. The distortion is manifested by the barrel shape of the images at the film plane. The lateral chromatism is manifested by the fact that the single bright square results in three images of different size and color at the film plane. Actually in terms of the light incident on the film there is a continuum of images ranging from the largest (red) to the smallest (violet) through all the spectral colors. Because the film responds with only three colors, namely red, green and blue, just three images are shown. FIG. 1B shows the neutralizing transparency element obtained when the film from the camera is processed. In FIG. 1C, the camera element has been converted to the viewer element by removing the nose portion 6 of the camera, replacing the film in its original position and providing back illumination with lamp 7. If the center of rotation of the observer's eye is at the previous position of the aperture, the white square (or any other scene) will be seen full size, undistorted, and in true perspective as it existed from the vantage point of the aperture at the time of the original exposure. As a practical matter, the square will be substantially white, but the sharpness of the reproduction of the white lines will be limited by a characteristic of the film that is discussed in more detail below.

A literal embodiment of the system substantially as shown in FIG. 1 will in fact provide a very impressive wide angle view if the system focal length is 100 mm or more—corresponding to a film format approximately 7 inches in diameter. For the preferred stereoscopic embodiments however, the two images must be coplanar at a spacing matching that of the eyes—about 2½ inches. A single lens magnifier of the required high magnification—about 7X—would not only be limited in field, but would have unacceptable field curvature and astigmatism. At least two elements are therefore required, as is set forth more fully below. If it is not required for viewing, the camera lens can be made much smaller. A two-element design that can be readily tailored to provide the prescribed operative amount of distortion and lateral chromatism with substantially complete correction of all other aberrations is set forth below.

Criteria for Life-Like Imagery—The Preferred System

To realize fully the benefits of the present invention, it should be embodied in a stereoscopic system having the following characteristics:

(1) Unity magnification or "orthoscopy" for the system. This requirement is sufficiently met if the angle with respect to the optical axis of each ray as it enters the eye from the viewer is sensibly the same as was the angle of the corresponding ray entering the camera when the scene was recorded.

(2) A field of view on the stereogram of 120 degrees or more, and a magnifier exit pupil large enough so that eye swivelling of plus or minus 45 degrees will not cause vignetting.

(3) A depth of field sensibly equal to that of the eye.

(4) Acuity and detail in the central field approximating that of the eye.

(5) Approximate equality of left and right camera and viewer optical axis spacing to human interocular spacing.

(6) Well-saturated color with good shadow density. Absolute minimum of flare.

The Neutralizing of Lateral Chromatism

Figure 2:
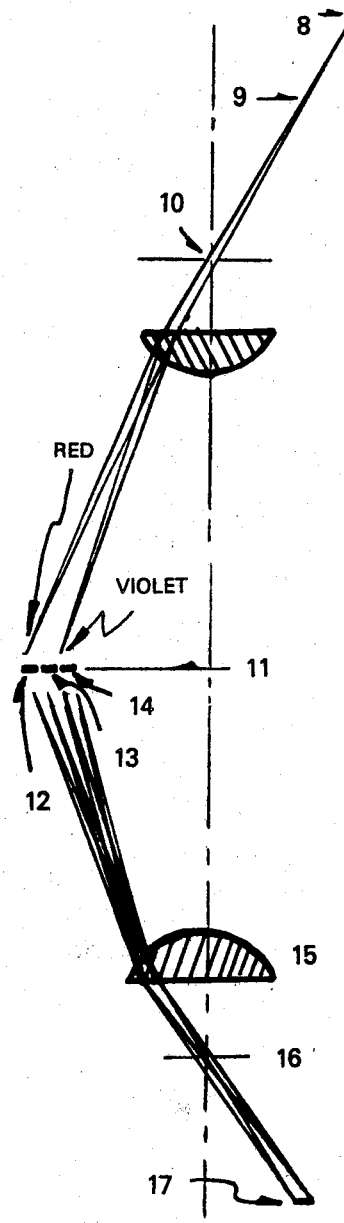
FIG. 2 shows in exaggerated form the line color spectrum of a point produced by a simple camera lens and recorded as short red, green and blue lines by color film, which image is then reduced to a short white line on the retina by a simple viewer lens.

Achieving the required very wide angle of view depends on the cancellation of visible lateral color in the viewer by fringes recorded on the film. FIG. 2 illustrates the essential principle. An off-axis point source of white light, 8, produces a ray, 9, that passes through the camera aperture, 10, and is refracted and dispersed into a short radial line spectrum at the film, 11. It is this dispersion that is called "lateral chromatism", or "chromatic difference of magnification," and which is the grossest aberration of most simple lenses; it is responsible for the color fringes observed off-axis in simple systems. Actual color film responds to this short spectrum by producing three shorter bands of color, red, green, and blue, 12, 13, and 14.

A simple viewer lens, 15, in conjuction with the aperture of the eye, 16, will, according to its own dispersion characteristics, tend to superimpose the three color segments 12, 13, and 14 into a short radial white line, 17, on the retina of the viewer's eye. I call the ratio of the length of the spectrum on the film at 11 to the length of the white residue, 17, normalized, the "refinement" of the film in the case of reversal film, or of the films and the process in the case of negative film. The neutralization of lateral chromatism is thus owing to two factors: a geometrical reduction or "refinement" of the spectrum (limited in conventional films to a factor of 2.5 to 3) and an elimination of color owing to the recombination of the primaries into white light. In the present embodiments of the invention, even using available films, the refinement is such as to make astigmatism and field curvature, rather than lateral chromatism, the dominant aberrations of the magnifier. The elimination of spurious color can be made sensibly complete.

Design of the Magnifier

Figure 3:
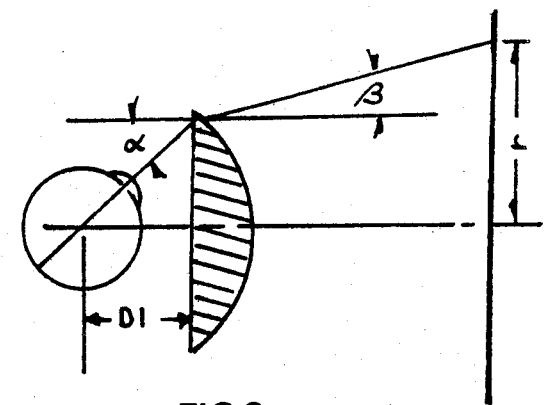
FIG. 3 is a schematic cross section of an elementary viewer showing the relationship of eye, magnifier and transparency.

FIG. 3 is a schematic of an eye and magnifier showing some basic design constraints. The distance D1 from the center of rotation of the eyeball to the near vertex of the eye lens should not, in consideration of eyelash clearance, be less than 25 mm. Thus, if the eyelens is plano-convex, it must be 50 mm in diameter for a 90 degree field. If the back of the lens is convex, as in spectacles, the same diameter will give a wider field at the loss of some refractive power. In both cases lateral movement of the center of rotation of the eye will reveal more of the field, so that limitations of the field by the eye lens for a fixed position of the eyeball center cannot be taken as specifying the necessary field of the stereogram.

Figure 4:
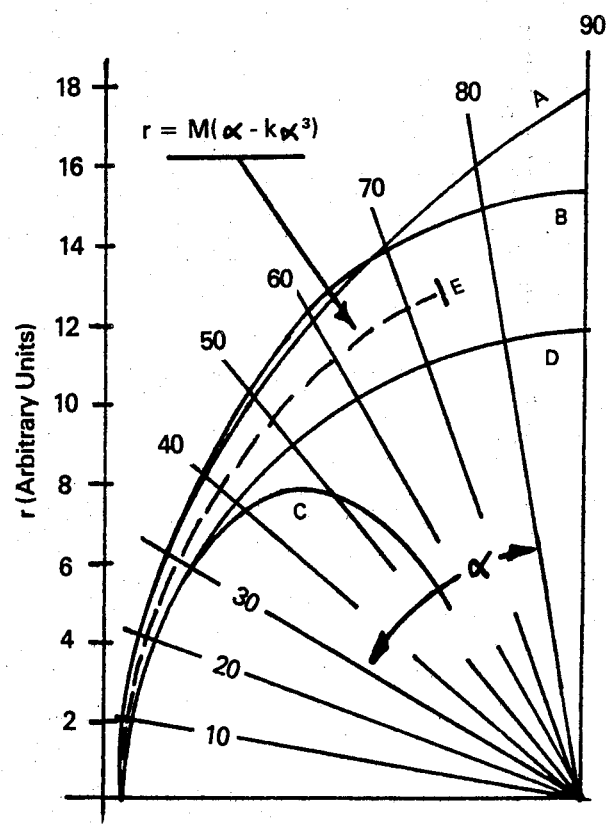
FIG. 4 gives the relationship of angle of eye movement to radial location on the transparency for typical magnifiers.

FIG. 4 gives distortion curves for various magnifiers. The abscissa is the radial displacement from the optical axis of points on the neutralizing transparency. The angle $\alpha$ is the angular position of the corresponding points in the original scene and thus also the required rotation of the eyeball if the point is to be seen sharply.

It will be clear to those skilled in the art that the curves may therefore be interpreted as one half of an axial section of the principal surface of the magnifier. Curve A represents a form of distortion in which the radial displacement is proportional to angle, and is found in many "fisheye" lenses. The actual view of the world as perceived by a fish (or scuba diver) is given at B for water with an index of 1.5. It is remarkably close to the first "linear" curve out to 70 degrees. Curve C is the distortion of a representative thick plano-convex spherical lens with the eye very close. Curve D, in which the displacement is proportional to the sine of $\alpha$, would represent an excellent design objective from the point of view of packing the largest angle of view in the available format with minimum magnification. In a magnifier with this distortion curve it would however be impractically difficult to achieve a tolerable reduction of astigmatism and field curvature. The dotted curve E therefore represents an optimization of these several factors defined within a few degrees (but not beyond 70 degrees off axis) by the value of k in the magnifier distortion formula:

$$4 = M(\alpha - k\alpha^3)$$

where M is the system magnification and k has a prescribed operative value greater than zero and less than 0.25.

The lateral chromatism of the optimum magnifier, measured in degrees between the red and the blue images at 45 degrees off axis, represents an upper bound to the prescribed and operative amount of lateral chromatism in the neutralizing transparency.

Embodiments of the Magnifier

Figure 5:
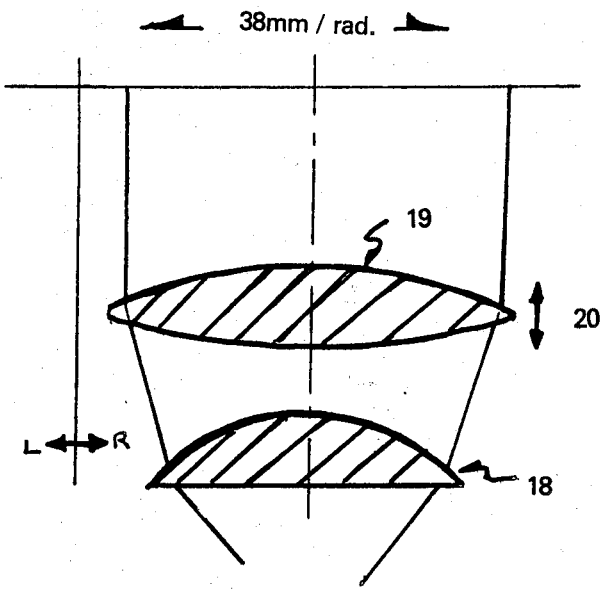
FIG. 5 is a horizontal cross section of the present magnifier.

FIG. 5 is a horizontal section of the present embodiment of the viewer magnifiers. 18 is a plano-convex spherical glass eye lens of 43 mm diameter and 76 mm focal length. 4 or 5 mm is ground off the lower inside for nose clearance, and the stereo pair are immovably mounted. 19 is an asymmetrical double convex spherical glass movable element of 60 mm diameter and 72 mm focal length. Individual eye focus is obtained by moving this larger element as indicated by the arrows 20. The angle of view of this magnifier is somewhat restricted by the eye lens. The fact that all surfaces are positive and spherical gives a large k and excessive astigmatism and positive curvature of the field.

Figure 6:
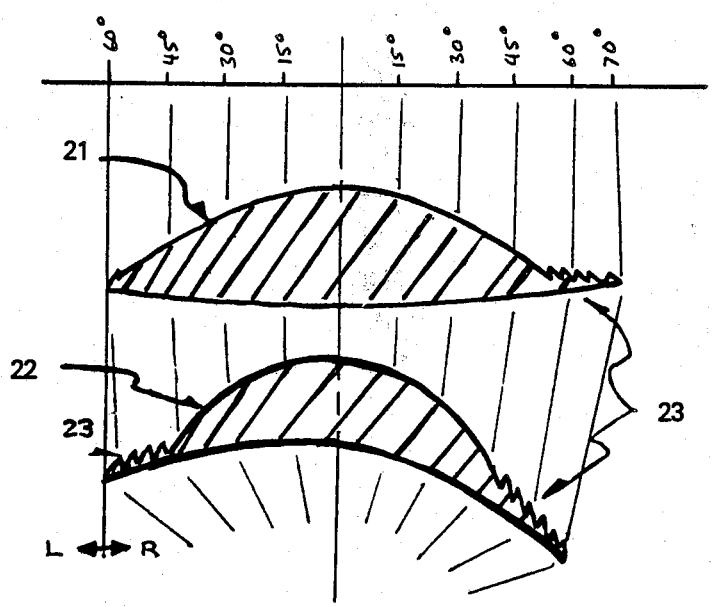
FIG. 6 is a horizontal cross section of a form of magnifier preferred for high performance.

A preferred embodiment of the magnifier is given in horizontal section in FIG. 6. The elements can be molded from plastic as the surfaces need only be of spectacle quality. The front surface, 21, of the larger element can be aspheric to flatten the fields and control k. The eye lens, 22, has some "wrap-around" to extend the lateral field, which is formed of Fresnel zones 23 to retain refractive power without excessive thickness.

Figure 7:
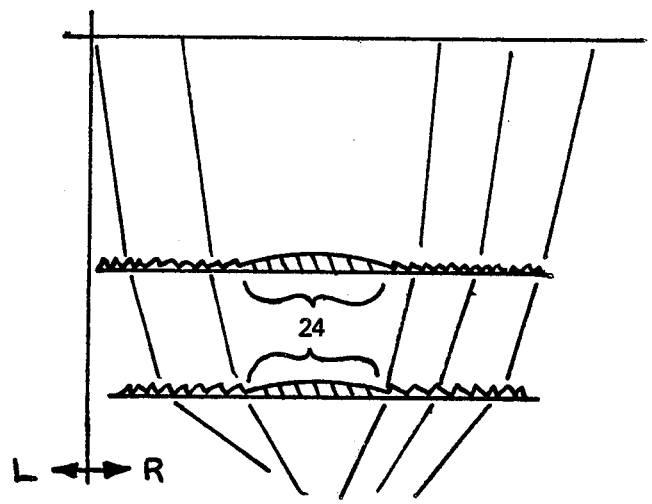
FIG. 7 is a horizontal cross section of a form of magnifier perferred for low cost.

Another magnifier embodiment, preferred for economy, is shown in FIG. 7. Here the magnifiers are very thin and flat, being mostly made up of Fresnel zones, and leaving only a small central area, 24, if any, of conventional lens surface.

Preferred Embodiment of the Neutralizing Stereogram

Figure 8:
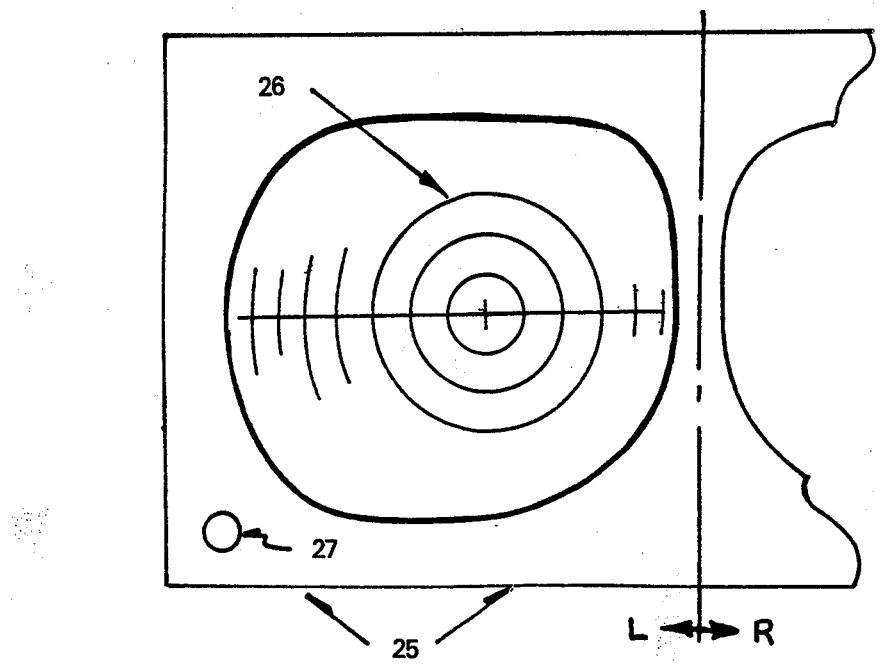
FIG. 8 is the full size layout of a neutralizing stereogram.

FIG. 8 is a full-scale rendering of the neutralizing stereogram. The mounting frame, 25, may be of plastic or cardboard or of any other suitable material. The magnification and distortion, as well as the likely field limits are indicated by the circles, 26, concentric with the left optical axis at intervals of 10 degrees. The magnification and distortion, the operative amount of lateral chromatism and suitable register and indexing holes, 27, will be part of the specification of the stereogram.

The film used in the neutralizing stereogram is 70 mm wide print film without sprocket holes, but preferably having perforations matching the holes, 27, of the stereogram mount. These holes will facilitate indexing during printing and cutting and ensure proper registration with the mount.

This film preferably has an emulsion capable of withstanding the high temperatures commonly used in automatic paper print processing machines, so the material can be developed right along with paper rolls.

Camera Lens Design

Figure 9:
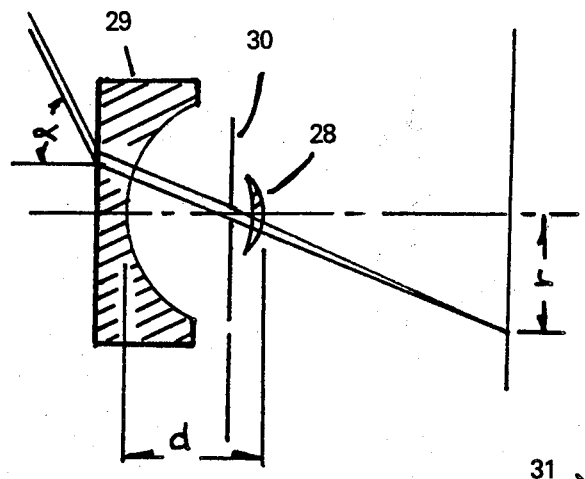
FIG. 9 is a schematic cross section of the present camera lens arrangement.

If in FIG. 9 the meniscus lens, 28, has a positive focal length approximating the negative focal length of the diverging lens, 29, we have the camera lens of the present invention. It is well known that such a combination will, for a single color, have a stigmatic flat field in the absence of coma and spherical aberration regardless of the location of the stop. (Hardy & Perrin, "Principles of Optics" McGraw-Hill, 1932.) If, to match the depth of field of the human eye, the entrance pupil produced by stop 30 is reduced to 1 to 2 mm, I find that, for all focal lengths of interest, coma and spherical aberration, and longitudinal chromatism as well, are eliminated both sensibly and sufficiently to meet the above conditions for a stigmatic flat field. Of the seven third order aberrations we have remaining only distortion and lateral chromatism. Such a lens would ordinarily be worthless, but these are precisely the aberrations needed to produce neutralizing images. Given the overall focal length and lens material, and the required distortion and lateral chromatism, the spacing and bending and focal lengths of the two elements and the stop position can be determined by well-known methods. A plano front surface is preferred, so that an easily cleaned panoramic flat window will be the exposed lens surface of the camera. As a practical matter, if the stop, 30, is located near a meniscus positive element, 28, as in FIG. 9 the field can, in the well-known manner of a box camera lens, be "artificially flattened", even though the meniscus lens is much stronger than the negative lens. A filter severely restricting the near ultraviolet should be included to minimize an apparent flare in the neutralization regions of the image caused by the extended blue sensitivity of many color emulsions. In the best cameras the elements should be anti-reflection coated for the ultimate in freedom from concern about flare.

It should be noted that the surfaces of the camera lenses, like those of the viewer lenses, need not be figured with the precision ordinarily accorded photographic optics. Because of the small relative aperture, "spectacle quality" will suffice, making molding the units in plastic particularly attractive.

Camera Film

Figure 10:
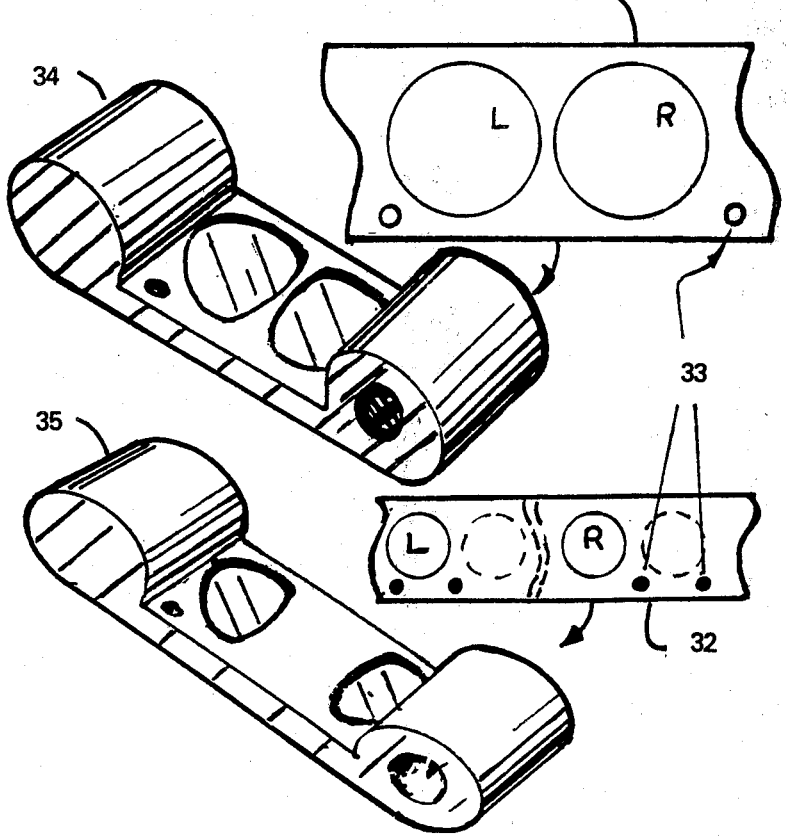
FIG. 10 shows preferred large and small format films and cassettes.

FIG. 10 shows two preferred embodiments of the camera film, one for a large format 31, in which the left and right images are close together, and a second, more economical format 32 in which the left and right images of a stereo pair are about half as large and are separated by one of the images of a second pair. In each case perforations 33, are associated with each stereo pair to facilitate indexing during printing.

In order to maximize the refinement of the film, as discussed above, without objectionable "color blindness" the sensitizers used in the camera film color emulsions have preferably a somewhat narrow spectral sensitivity similar to the kind in well-known films designed for use as color internegatives, but optimized for neutralizing use.

Drop-in cassettes 34 and 35 provided preferably to enhance ease of use, reflect the different separations of the two formats.

Projection Printer

Figure 11:
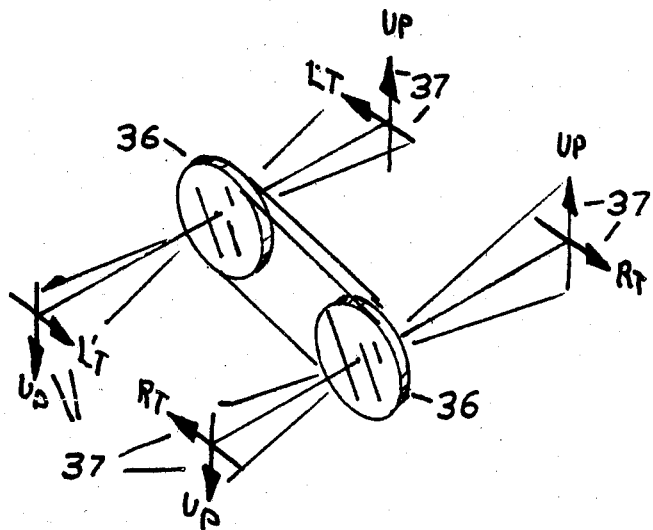
FIG. 11 shows the optical layout of an image transposing steroptic projection printer.
Figure 12:
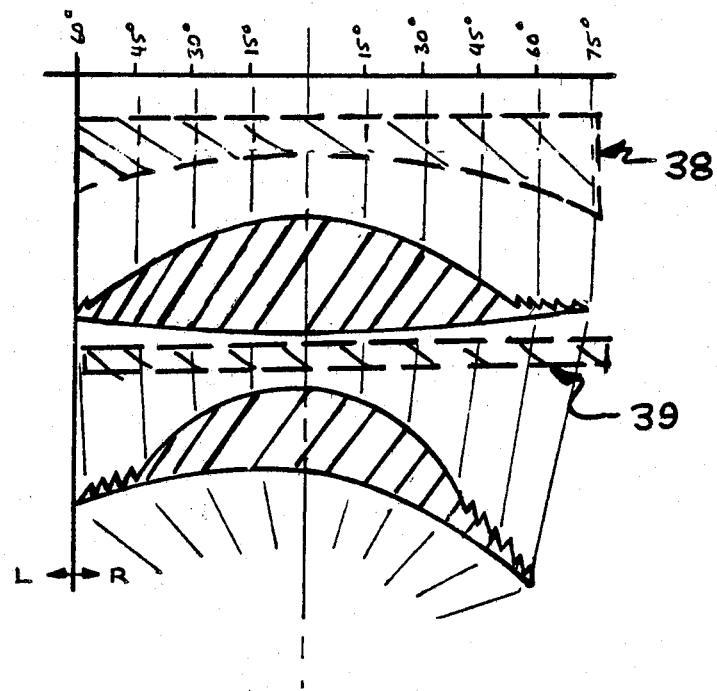
FIG. 12 is a horizontal section of a preferred embodiment of a magnifier having both field correcting lens 38, and opthalmic correcting lens 39.

When reversal film is used it is necessary to cut apart and transpose the left and right images of the stereo pair. In a preferred embodiment of the system negative film is used and a projection printer having the optical arrangement shown schematically in FIG. 11 makes this transposition automatically without cutting and remounting. Exposure is made through the two projection lenses 36, simultaneously, restoring the correct up/down—right/left relationship of the images, as shown by the arrows 37.

OTHER FEATURES OF THE INVENTION

The greatest benefit of the invention will accrue to the casual photographer who will no longer have to be concerned about perspective, framing or degree of enlargement. Scenics will return from the processor with the full size and sweep that inspired the photographer. Buildings will be undistorted; interiors will include everything around the room; portraits can have close-up immediacy without distortion; nothing will be left out of the picture. In the simplest camera there can be no thought of focal length, focus, framing, exposure, or aperture: the camera will capture what the eyes see, not only with stereoscopic realism, but with a depth of field matching that of the eye, and a sense of sharpness that is significantly enhanced by seeing with two eyes. Most photographs made now by casual photographers are quickly filed in a drawer and forgotten. The greater photographic vividness made possible for the most casual snapshooter by this invention, especially when the photographs are displayed in table-top and double-service lamp viewers that are not put away, can bring to photography a personal immediacy in daily life that it has not heretofore enjoyed.

The commercial utility of the panoramic views made possible by this invention will be obvious to travel and real estate agents, and to architects, interior decorators and city planners, among others.

The realism and depth and orthoscopy of the images produced by this invention will be of special utility in medicine (pathology, surgery, anatomy), forensics (identification and scene recording), archeology (artifacts in situ), and art (sculptures, museum records), among others.

Systems for group viewing of the images will have obvious utility in general education, military training, sales presentations and business orientations, among others.

I claim:
1. A method of color imaging comprising:
    (a) forming, with a plurality of lens elements, a first image while introducing a predetermined chromatic difference in lateral magnification;
    (b) storing the first image so formed in a heterochromatic light recording medium; and
    (c) forming, from the stored first image, a second image, while introducing a chromatic difference in lateral magnification that is opposite to the predetermined chromatic difference in lateral magnification introduced in step (a).
2. A method according to claim 1, wherein
    (i) step (a) is carried out while also introducing a predetermined negative radial distortion; and

(ii) step (c) is carried out while also introducing positive radial distortion.

3. A method according to claim 1, for stereoptic imaging, wherein the first image is of a scene in object space, such scene as viewed from a given location, and further comprising:
(d) forming, with a plurality of lens elements, a third image, of the scene as viewed from an adjacent location, while introducing a predetermined chromatic difference in lateral magnification;
(e) storing the third image so formed in a heterochromatic light recording medium; and
(f) forming, from the stored third image, a fourth image, while introducing a chromatic difference in lateral magnification that is opposite to the predetermined chromatic difference in lateral magnification introduced in step (d).

4. A method according to claim 3, wherein
(i) steps (a) and (d) are each carried out while also introducing a predetermined negative radial distortion; and
(ii) steps (c) and (f) are each carried out while also introducing positive radial distortion.

5. A color imaging system, comprising:
(a) first means, including a plurality of lens elements, for forming a first image of a scene in object space, such scene viewed from a given location, while introducing a predetermind chromatic difference in lateral magnification;
(b) a heterochromatic light recording medium for storing the first image so formed; and
(c) second means, for forming a second image from the stored image, while introducing a chromatic difference in lateral magnification that is opposite to the predetermined chromatic difference in lateral magnification introduced by the first means.

6. A system according to claim 5, wherein
(i) the first means includes means for forming a first image while also introducing a predetermined negative radial distortion; and
(ii) the second means includes means for forming a second image while also introducing positive radial distortion.

7. A system according to claim 5, for stereoptic imaging, further comprising
(d) third means, including a plurality of lens elements, for forming a third image, of the scene as viewed from an adjacent location, while introducing a predetermined chromatic difference in lateral magnification;
(e) a heterochromatic light recording medium for storing the third image so found; and
(f) fourth means, for forming a fourth image from the stored third image, while introducing a chromatic difference in lateral magnification that is opposite to the predetermined chromatic difference in lateral magnification introduced by the first means.

8. A system according to claim 7 wherein
(i) each of the first and third means also includes means for forming an image while also introducing a predetermined negative radial distortion; and
(ii) each of the second and fourth means includes means for forming a second image while also introducing positive radial distortion.

9. A heterochromatic light recording medium containing an image formed by a lens system corrected for at least astigmatism and curvature of field of a scene in object space, such scene viewed from a given location, into which image has been introduced a predetermined chromatic difference in lateral magnification.

10. A medium in accordance with claim 9 in which there has also been introduced into the image a predetermined negative radial distortion.

11. A medium in accordance with claim 10, also containing a second image, formed by a lens system corrected for at least astigmatism and curvature of field, of the scene as viewed from an adjacent location, into which second image there has been introduced
(i) a predetermined chromatic difference in lateral magnification and (ii) a predetermined negative radial distortion.

12. A medium in accordance with claim 9, also containing a second image formed by a lens system corrected for at least astigmatism and curvature of field of the scene as viewed from an adjacent location, into which second image there has also been introduced a predetermined chromatic difference in lateral magnification.

13. A method of color imaging, comprising:
(a) forming a first image, of a scene in object space, while introducing both a predetermined chromatic difference in lateral magnification and a predetermined negative radial distortion, wherein the first image has
(i) a chromatic difference in lateral magnification that has approximate radial symmetry about an axis point and
(ii) negative radial distortion of the approximate form $r = M(\alpha - k\alpha^3)$, where r is the radial distance of an image point from the axis point, $\alpha$ is the angle which a ray of light from a point in the object space that is conjugate to the image point forms with a central axis, such central axis being the line extending to the axis point from a point in the object space conjugate to the axis point, M is a system parameter, and $0 \leq k \leq \frac{1}{4}$;
(b) storing the first image so formed in a heterochromatic light recording medium; and
(c) forming, from the stored first image, a second image, while introducing both (i) a chromatic difference in lateral magnification that is opposite to the predetermined chromatic difference in lateral magnification introduced in step (a) and (ii) positive radial distortion.

14. A method according to claim 13, wherein $0 < k$.

15. A method according to claim 13, for stereoptic imaging, wherein the first image is of a scene in object space, such scene as viewed from a given location, and further comprising:
(d) forming a third image, of the scene as viewed from an adjacent location, while introducing both a predetermined chromatic difference in lateral magnification and a predetermined negative radial distortion;
(e) storing the third image so formed in a heterochromatic light recording medium; and
(f) forming, from the stored third image, a fourth image, while introducing both (i) a chromatic difference in lateral magnification that is opposite to the predetermined chromatic difference in lateral magnification introduced in step (d) and (ii) positive radial distortion; and
wherein each of the first and third images has
(i) a chromatic difference in lateral magnification that has approximate radial symmetry about an axis point and (ii) negative radial distortion of the approximate form $r = M(\alpha - k\alpha^3)$, where r is the radial distance of an image point from the axis point, $\alpha$ is the angle which a ray of light from a point in the object space that is conjugate to the image point forms with a central axis, such central axis being the line extending to the axis point from a point in the object space conjugate to the axis point, M is a system parameter, and $0 < k \leq \frac{1}{4}$.

16. A color imaging system, comprising:
(a) first means for forming a first image of a scene in object space, such scene viewed from a given location, while introducing both a predetermined chromatic difference in lateral magnification and a predetermined negative distortion, such first image having
 (i) a chromatic difference in lateral magnification that has approximate radial symmetry about an axis point and
 (ii) negative radial distortion of the approximate form $r = M(\alpha - k\alpha^3)$, where r is the radial distance of an image point from the axis point, $\alpha$ is the angle which a ray of light from a point in the object space that is conjugate to the image point forms with a central axis, such central axis being the line extending to the axis point from a point in the object space conjugate to the axis point, M is a system parameter, and $0 \leq k \leq \frac{1}{4}$;
(b) a heterochromatic light recording medium for storing the first image so formed; and
(c) second means, for forming a second image from the stored image, while introducing both (i) a chromatic difference in lateral magnification that is opposite to the predetermined chromatic difference in lateral magnification introduced by the first means and (ii) positive radial distortion.

17. A system according to claim 16, wherein $0 < k$.

18. A system according to claim 16, in which the first means has a total angle of view of the scene of at least 60 degrees.

19. A system according to claim 18, in which the first means includes a simple positive lens and a simple negative lens.

20. A system according to claim 16, for stereoptic imaging, further comprising:
(d) third means, for forming a third image, of the scene as viewed from an adjacent location, while introducing both a predetermined chromatic difference in lateral magnification and a predetermined negative radial distortion;
(e) a heterochromatic light recording medium for storing the third image so formed; and
(f) fourth means, for forming a fourth image from the stored third image, while introducing both (i) a chromatic difference in lateral magnification that is opposite to the predetermined chromatic difference in lateral magnification introduced by the first means and (ii) positive radial distortion;
wherein each of the first and third means includes means for forming an image having
 (i) a chromatic difference in lateral magnification that has approximate radial symmetry about an axis point and
 (ii) negative radial distortion of the approximate form $r = M(\alpha - k\alpha^3)$, where r is the radial distance of an image point from the axis point, $\alpha$ is the angle which a ray of light from a point in the object space that is conjugate to the image point forms with a central axis, such central axis being the line extending to the axis point from a point in the object space conjugate to the axis point, M is a system parameter, and $0 < k \leq \frac{1}{4}$.

21. A heterochromatic light recording medium containing an image of a scene in object space, such scene viewed from a given location, into which image has been introduced both a predetermined chromatic difference in lateral magnification and a predetermined negative radial distortion wherein the image has
 (i) a chromatic difference in lateral magnification that has approximate radial symmetry about an axis point and
 (ii) negative radial distortion of the approximate form $r = M(\alpha - k\alpha^3)$, where r is the radial distance of an image point from the axis point, $\alpha$ is the angle which a ray of light from a point in the object space that is conjugate to the image point forms with a central axis, such central axis being the line extending to the axis point from a point in the object space conjugate to the axis point, M is a system parameter, and $0 < k \leq \frac{1}{4}$.

22. A medium in accordance with claim 21, also containing a second image of the scene as viewed from an adjacent location, into which second image there has also been introduced both a predetermined chromatic difference in lateral magnification and a predetermined negative radial distortion, wherein the second image has
 (i) a chromatic difference in lateral magnification that has approximate radial symmetry about an axis point and
 (ii) negative radial distortion of the approximate form $r = M(\alpha - k\alpha^3)$, where r is the radial distance of an image point from the axis point, $\alpha$ is the angle which a ray of light from a point in the object space that is conjugate to the image point forms with a central axis, such central axis being the line extending to the axis point from a point in the object space conjugate to the axis point, M is a system parameter, and $0 < k \leq \frac{1}{4}$.

* * * * *